US010773969B1

(12) United States Patent
Bessenet et al.

(10) Patent No.: US 10,773,969 B1
(45) Date of Patent: Sep. 15, 2020

(54) METHOD FOR PRODUCING POTASSIUM SULFATE AND SODIUM CHLORIDE FROM WASTEWATER

(71) Applicant: Veolia Water Technologies, Inc., Moon Township, IL (US)

(72) Inventors: Sebastien Bessenet, Naperville, IL (US); Jinhai Feng, Singapore (SG); James F. Rieke, Naperville, IL (US); Timothy F. Rittoff, West Chicago, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 0 days.

(21) Appl. No.: 16/468,436

(22) PCT Filed: Nov. 22, 2017

(86) PCT No.: PCT/US2017/063028
§ 371 (c)(1),
(2) Date: Jun. 11, 2019

(87) PCT Pub. No.: WO2018/111517
PCT Pub. Date: Jun. 21, 2018

Related U.S. Application Data

(60) Provisional application No. 62/432,738, filed on Dec. 12, 2016.

(30) Foreign Application Priority Data

May 8, 2017 (CN) .......................... 2017 1 0316634

(51) Int. Cl.
*C01D 5/16* (2006.01)
*C01D 5/08* (2006.01)
(Continued)

(52) U.S. Cl.
CPC ................ *C01D 5/08* (2013.01); *C01D 3/06* (2013.01); *C01D 5/16* (2013.01); *C02F 1/442* (2013.01); *C02F 1/5236* (2013.01)

(58) Field of Classification Search
CPC ... C01D 5/08; C01D 3/06; C01D 5/16; C01D 5/00; C02F 1/52; C02F 1/44; C02F 1/442
See application file for complete search history.

(56) References Cited

U.S. PATENT DOCUMENTS 4,215,100 A 7/1980 Sokolov et al.
6,143,271 A * 11/2000 Holdengraber .......... C01D 5/00
23/302 R
(Continued)

FOREIGN PATENT DOCUMENTS

CN 1119625 A 4/1996
CN 1168861 A 12/1997
(Continued)

OTHER PUBLICATIONS

Chen, W., et al., "Process Chemistry and Technology for Inorganic Chemicals", Aug. 31, 2001, pp. 1-4.
(Continued)

*Primary Examiner* — Timothy C Vanoy
(74) *Attorney, Agent, or Firm* — Coats & Bennett PLLC

(57) ABSTRACT

A method of producing potassium sulfate by employing sodium sulfate and potassium chloride sources is disclosed. The method includes a crystallization process that yields a mother liquor containing sulfate, sodium and chloride. The mother liquor is directed to an anion segregation unit that produces a reject or retentate rich in sulfate which is recycled and employed in the production of the potassium sulfate. Further, the anion segregation unit produces a per-
(Continued)

meate that is depleted in sulfate but includes sodium and chloride and is directed to a sodium chloride crystallizer for producing sodium chloride.

25 Claims, 10 Drawing Sheets

(51) Int. Cl.
*C01D 3/06* (2006.01)
*C02F 1/52* (2006.01)
*C02F 1/44* (2006.01)

(56) References Cited

U.S. PATENT DOCUMENTS 9,475,712 B2  10/2016  Mack et al.
2016/0348310 A1  12/2016  Begley et al.

FOREIGN PATENT DOCUMENTS

| | | | | |
|---|---|---|---|---|
| CN | 1189456 | A | 8/1998 | |
| CN | 102616891 | A | 8/2012 | |
| CN | 104961285 | A | 10/2015 | |
| CN | 205387520 | U | 7/2016 | |
| CN | 105859003 | A | 8/2016 | |
| CN | 105906111 | A | 8/2016 | |
| CN | 105948362 | A | 9/2016 | |
| CN | 205549631 | U | 9/2016 | |
| CN | 106006681 | A | 10/2016 | |
| CN | 106116002 | A | 11/2016 | |
| CN | 106145223 | A | 11/2016 | |
| CN | 107398181 | A * | 11/2017 | ............. B01D 61/48 |
| CN | 108889129 | A * | 11/2018 | ........... B01D 61/027 |
| DE | 4340105 | C1 | 1/1995 | |

OTHER PUBLICATIONS

CN Search Report dated Mar. 19, 2019 in re CN Application No. 201710316634.1 filed May 8, 2017.
CN Search Report dated Oct. 21, 2019 in re CN Application No. 201710316634.1 filed May 8, 2017.

* cited by examiner

METHOD FOR PRODUCING POTASSIUM SULFATE AND SODIUM CHLORIDE FROM WASTEWATER

FIELD OF THE INVENTION

The present invention relates to systems and processes for producing potassium sulfate.

BACKGROUND

One of the challenges in producing potassium sulfate is doing so in a cost effective and efficient process. In this regard, the challenge often lies in how to cost effectively treat the residual liquor(s) (such as the mother liquor produced in a glaserite crystallizer) produced in the potassium sulfate production process to reach reasonably high conversion yield. Use of cooling crystallization or evaporative crystallization, sometimes used in the production of potassium sulfate, requires large amounts of energy which increases the cost of producing potassium sulfate.

There is a need for a potassium sulfate production process that provides a cost effective way of treating residual liquors produced in the course of producing the potassium sulfate.

SUMMARY OF THE INVENTION

The present invention relates to a process for producing potassium sulfate and sodium chloride from sodium sulfate and potassium chloride sources. In the course of producing potassium sulfate, residual liquor, such as a glaserite crystallizer mother liquor, is produced. To deplete the residual liquor of sulfate, an anion segregation unit is used. The residual liquor is directed to the anion segregation unit which yields a reject or retentate and a filtrate or permeate. The reject or retentate is rich in sulfate. Filtrate or permeate (depleted in sulfate) from the anion segregation unit is directed to a sodium chloride crystallizer that produces sodium chloride crystals. In one embodiment, the anion segregation unit is a nanofiltration membrane.

In one embodiment, a source of sulfate, such as sodium sulfate, is mixed with a liquor containing potassium and the mixture is subjected to a glaserite crystallization process that produces glaserite crystals. The glaserite crystals are directed to a potassium sulfate reactor where a source of potassium, such as potassium chloride, is mixed with the glaserite crystals. This results in the precipitation and the formation of potassium sulfate crystals that are separated from the liquor. Mother liquor produced by the glaserite crystallizer is directed to the anion segregation unit, such as a nanofiltration membrane unit. A reject or retentate stream is produced by the anion segregation unit which is rich in sulfate. The permeate or filtrate produced by the anion segregation unit is substantially depleted of sulfate. In one embodiment, the permeate produced by the anion segregation unit contains both sodium and chloride which is directed to a sodium chloride crystallizer which forms sodium chloride crystals.

In another embodiment, a process is disclosed for producing potassium sulfate from a waste stream. The waste stream is concentrated to form a brine that includes sodium, chloride and sulfate. Thereafter the method entails crystallizing mirabilite from the brine in a mirabilite crystallizer to form mirabilite crystals and a mirabilite crystallizer liquor. Mirabilite crystals are separated from the mirabilite crystallizer liquor. Then the method entails mixing the mirabilite crystals with a liquor containing potassium in a glaserite reactor to form glaserite crystals. The glaserite crystals are separated from the liquor. Thereafter, the glaserite crystals are directed to a potassium sulfate reactor. A potassium source, such as potassium chloride, is mixed with the glaserite crystals in the potassium sulfate reactor to form potassium sulfate crystals and the liquor containing the potassium. The potassium sulfate crystals are separated from the liquor.

In the process described immediately above for producing potassium sulfate, the process also includes filtering the mirabilite crystallizer liquor to form a filtrate or a permeate and a retentate or reject stream. The retentate or reject stream rich in sulfate is recycled to the mirabilite crystallizer. The filtrate or permeate depleted in sulfate is directed to a sodium chloride crystallizer that produces sodium chloride crystals.

Other objects and advantages of the present invention will become apparent and obvious from a study of the following description and the accompanying drawings which are merely illustrative of such invention.

DESCRIPTION OF EXEMPLARY EMBODIMENTS

The present invention relates to a process for producing potassium sulfate. Before discussing specific embodiments of the process, it may be beneficial to briefly review an overall process for producing potassium sulfate as described herein. A sodium sulfate source is provided. The sodium sulfate source is directed to a glaserite crystallizer. Downstream of the glaserite crystallizer is a potassium sulfate reactor. A potassium-rich liquor is directed from the potassium sulfate reactor to the glaserite crystallizer where the potassium-rich liquor is mixed with the sodium sulfate source. The glaserite crystallizer crystallizes glaserite to form glaserite crystals and a mother liquor. The glaserite crystals are separated from the mother liquor and directed to the downstream potassium sulfate reactor. A potassium chloride source is directed to the potassium sulfate reactor and mixed with the glaserite crystals. This results in the precipitation of potassium sulfate crystals in the potassium sulfate reactor. The potassium sulfate crystals are separated from the liquor in the potassium sulfate reactor.

Furthermore, the mother liquor from the glaserite crystallizer is directed to an anion segregation unit such as a nanofiltration unit. Here the anion segregation unit produces a reject stream rich in sulfate and a permeate stream depleted in sulfate. The reject stream rich in sulfate is directed back to the glaserite crystallizer and mixed with the sodium sulfate source and the potassium-rich liquor from the potassium sulfate reactor. Sodium chloride crystals are produced from the permeate stream depleted in sulfate.

Figure 1:
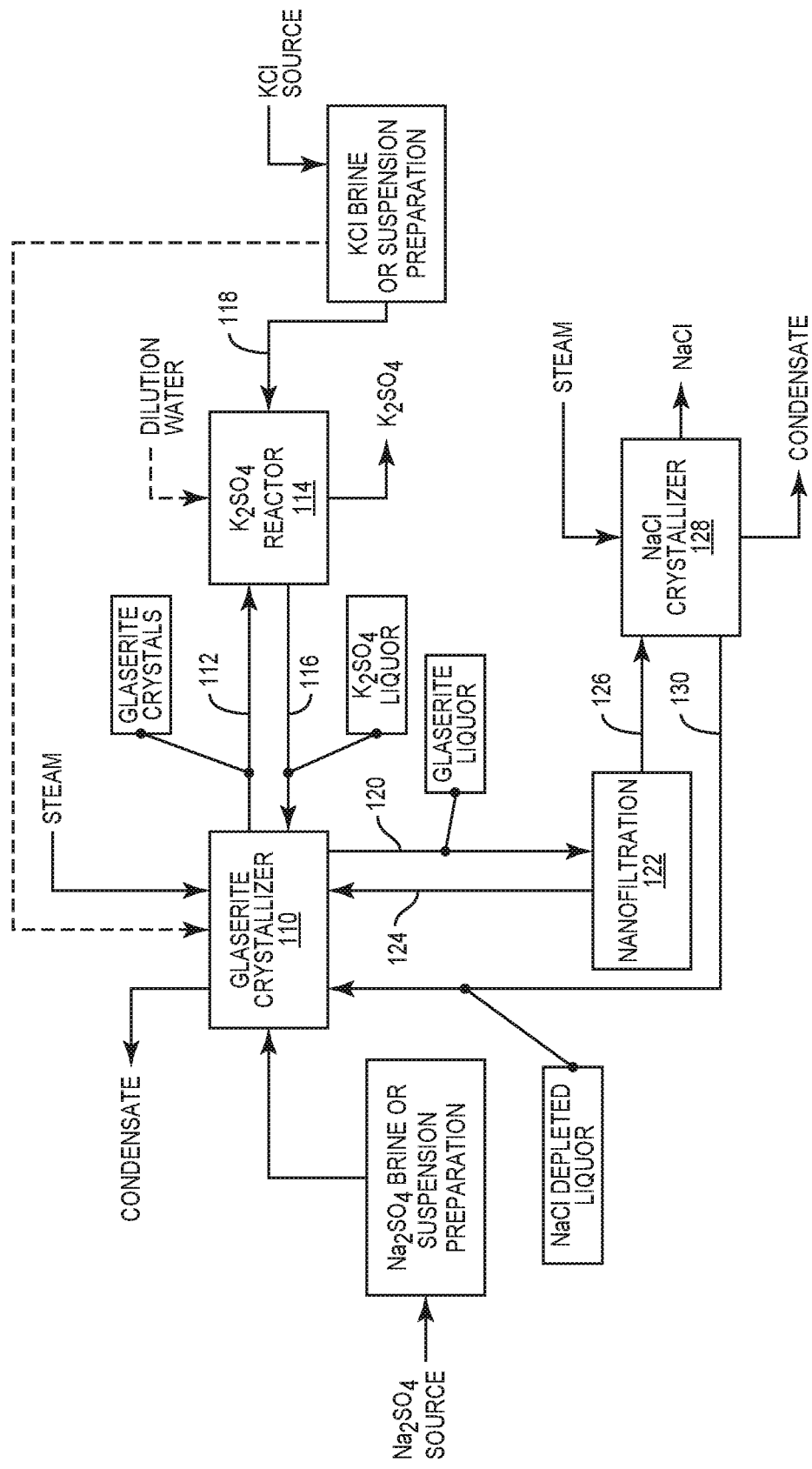
FIG. 1 is a schematic illustration of a process for producing potassium sulfate.

With respect to FIG. 1 and the potassium sulfate production process shown therein, a sodium sulfate source is directed to a glaserite crystallizer 110. The source for the sodium sulfate can vary. In one example, the sodium sulfate source may simply be sodium sulfate crystals or sodium sulfate crystals produced by an upstream process. Another example of a sodium sulfate source is a raw or melted Glauber's salt. In some cases, the sodium sulfate source may be naturally occurring Glauber's salts produced by natural evaporation and/or cooling in salted lakes. As depicted in FIG. 1, a sodium sulfate brine or a suspension preparation may also constitute the sodium sulfate source.

Liquor (sometimes referred to as potassium sulfate liquor) rich in potassium is directed from a downstream potassium sulfate reactor 114 via line 116 to the glaserite crystallizer 110. Here the potassium sulfate liquor is mixed with the sodium sulfate source in the glaserite crystallizer 110. Steam can be used to drive the evaporation in the glaserite crystallizer 110 if necessary. It is typically operated, in one exemplary process, at a temperature of approximately 40-45° C. This produces glaserite crystals, a mother liquor and potentially a condensate. Through any one of a number of conventional solids-liquid separation processes, the glaserite crystals produced by the glaserite crystallizer 110 is separated from the mother liquor. Separated glaserite crystals are directed via line 112 to the potassium sulfate reactor 114.

A potassium source is directed via line 118 to the potassium sulfate reactor 114 where the potassium source is mixed with the glaserite crystals in the potassium sulfate reactor. Generally, the purity of the potassium chloride source can be that of commercially available products from flotation grade to high purity potassium chloride or even brines with a substantial amount of impurities like sodium chloride, calcium or magnesium compounds, or other compounds that might be recycled from existing processes or waste or purged streams. As noted in FIG. 1, the potassium source may be a potassium chloride brine or a suspension preparation. A potassium chloride brine can be prepared by using clear water or a condensate to dilute the potassium chloride. Alternatively, the diluted solution may be made up of a mixture of clear water and any one of the mother liquors circulating in the system. In the latter case, the mixture of clear water and mother liquor may be treated to remove hardness (calcium and magnesium) as hydroxides, carbonate or sulfate compounds by using a conventional softening reagent, such as lime, soda ash or caustic soda.

In any event, in the process shown in FIG. 1, the potassium source is directed via line 118 into the potassium sulfate reactor 114 and mixed with the glaserite crystals therein. This results in potassium sulfate precipitating from the liquor and forming potassium sulfate crystals. The potassium sulfate crystals are separated from the liquor to yield the potassium sulfate ($K_2SO_4$) in FIG. 1. It may be noted that through the introduction of the sodium sulfate source into the glaserite crystallizer 110, it may be desirable to limit the concentration of sodium in the potassium sulfate reactor by maintaining the sodium concentration below its solubility limit. This, of course, facilitates the precipitation of potassium sulfate from the liquor in the potassium sulfate reactor 114. It may be noted also that the potassium source can be partly directed to the glaserite reactor when necessary for process control or start-up.

Mother liquor produced by the glaserite crystallizer 110 is directed via line 120 to an anion segregation unit. The purpose of the anion segregation unit is to retain or reject sulfate and at the same time produce a filtrate or permeate that is depleted in sulfate and, in this particular case, can be used to produce sodium chloride crystals. Various anion segregation devices and systems can be used to accomplish this. In the case of the examples shown herein, a nanofiltration unit 122 is employed. Mother liquor from the glaserite crystallizer 110 is directed through line 120 to the nanofiltration unit 122 which produces a reject stream and a permeate stream. Again, the reject stream is rich in sulfate and is recycled via line 124 back to the glaserite crystallizer 110 where it can be advantageously utilized to produce glaserite crystals. Permeate stream 126, as noted above, is depleted in sulfate. The nanofiltration unit 122 permits sodium and chloride ions to pass through the membranes and ultimately to the sodium chloride crystallizer 128. Permeate in line 126 is directed to a sodium chloride crystallizer 128 that is powered or driven by steam and which produces sodium chloride crystals that are separated from a mother liquor produced by the sodium chloride crystallizer 128. The sodium chloride crystallizer 128 is driven by steam or an MVR system and in one example is operated at a temperature of approximately 60-80° C. Mother liquor produced by the sodium crystallizer 128 is directed via line 130 to the glaserite crystallizer 110 for further processing therein.

Figure 2:
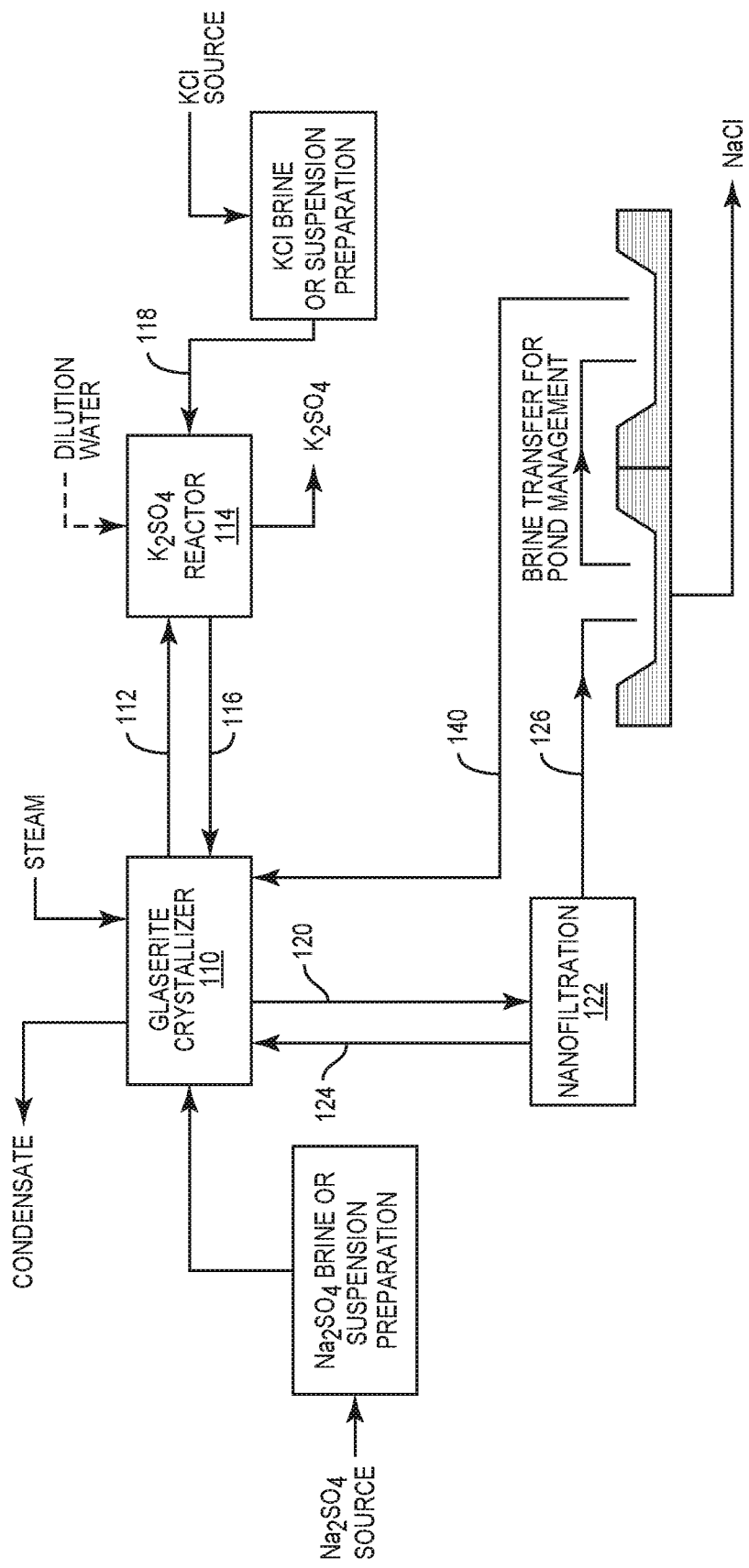
FIG. 2 is a schematic illustration that depicts a similar process for producing potassium sulfate but also includes a solar evaporation process for crystallizing sodium chloride.

FIG. 2 shows another process for producing potassium sulfate from sodium sulfate and potassium chloride sources. In the case of the FIG. 2 embodiment, compared to the process shown in FIG. 1, the sodium chloride crystallizer 128 has been replaced by a solar evaporation pond, basin or facility. This process relies on a low cost solar evaporation process to form the sodium chloride crystals. Depending on geographical location, the pond or basin used for solar evaporation can be subject to large seasonal temperature variations. Brine transferred between summer and winter can be necessary in order to avoid sodium chloride deposits that are polluted by the additional crystallization of other salts, particularly at low temperature.

In the case of the FIG. 2 process, permeate or filtrate from the anion segregation unit is directed via line 126 into the solar evaporation pond or basin. As discussed with respect to the FIG. 1 process, the permeate is depleted in sulfate but would, in this process, include sodium and chloride ions. The solar evaporation process concentrates the permeate or filtrate in the pond or basin, causing sodium chloride to precipitate and crystallize. Sodium chloride crystals are separated from the permeate or filtrate by any one of various conventional solids-liquid separation processes. Concentrated permeate or filtrate is directed through line 140 back to the glaserite crystallizer 110. Otherwise, the process of FIG. 2 is similar to the process of FIG. 1.

Figure 3:
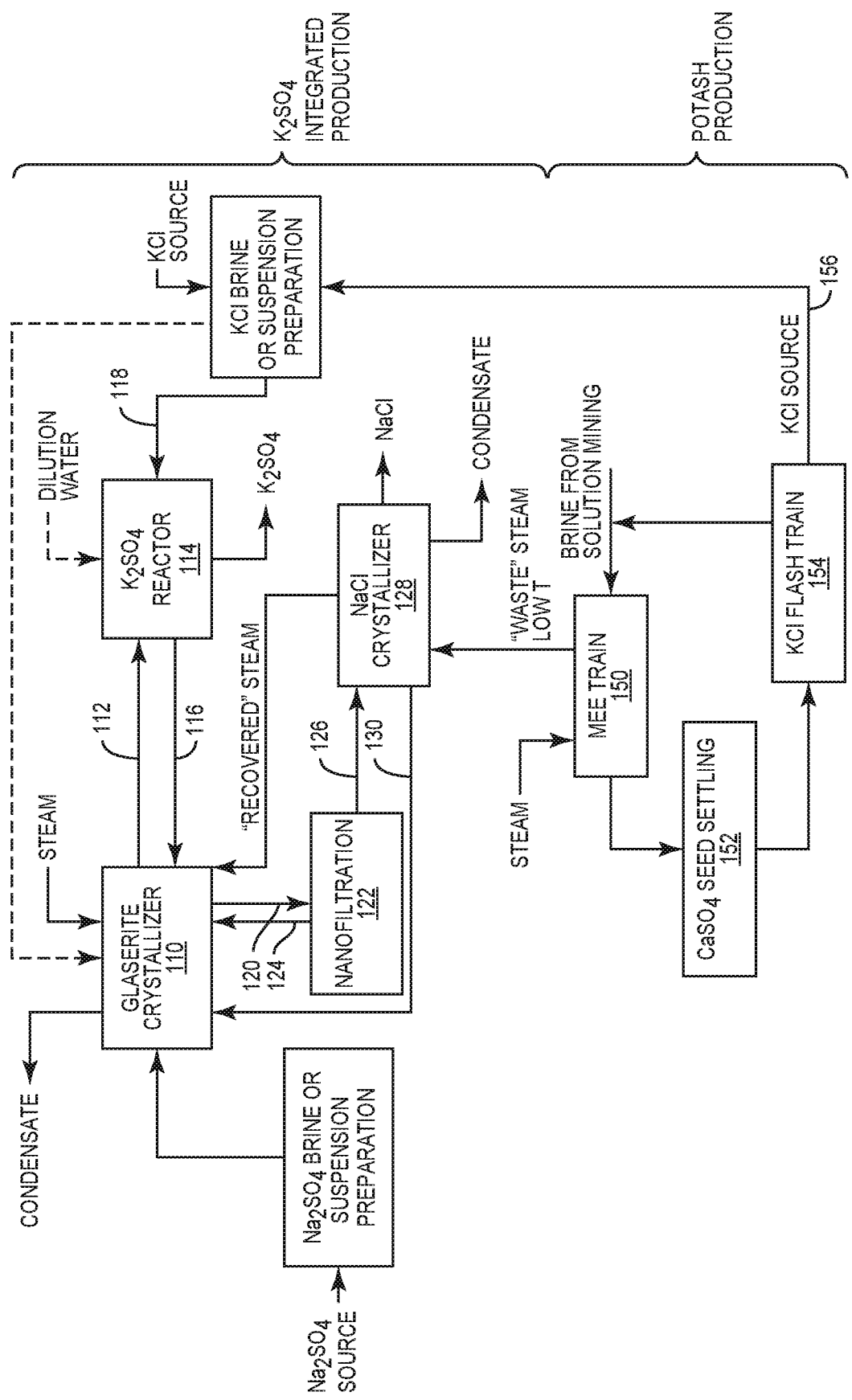
FIG. 3 is a schematic illustration showing a process for producing potassium sulfate that is integrated with a process for producing potash from a mining operation.
Figure 4:
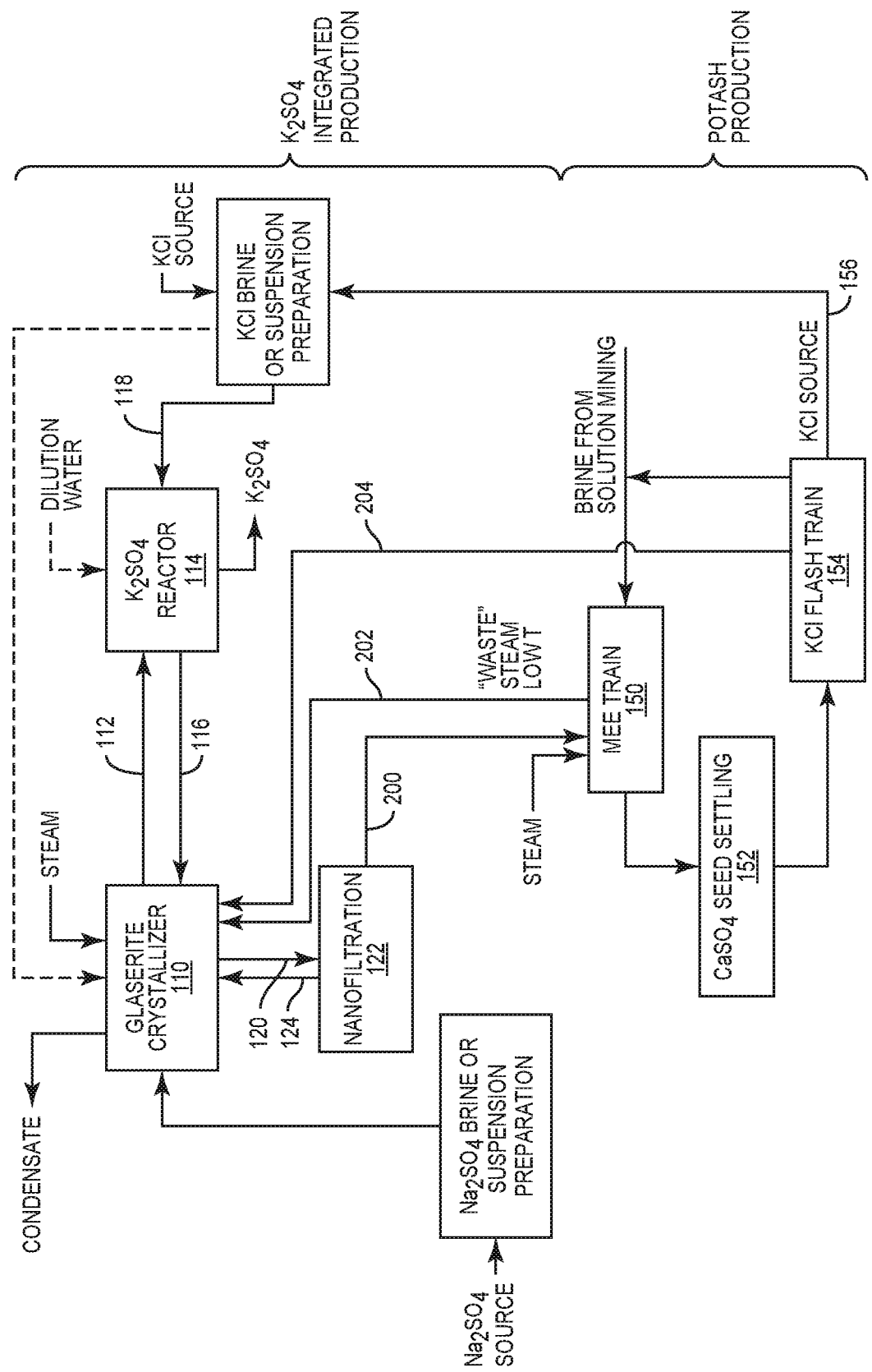
FIG. 4 is a schematic illustration of another embodiment for integrating a potassium sulfate production process with a process for producing potash.

In some cases, related or separate processes can be integrated with the potassium sulfate production process to provide the potassium source and wherein waste energy produced or resulting from one process can be used by the other process to reduce energy costs. Exemplary integrated processes are shown in FIGS. 3 and 4. Both processes depicted in FIGS. 3 and 4 combine a potassium sulfate production process with a potash production process.

With reference to FIG. 3, a potassium sulfate production process, similar to that shown in FIG. 1, is integrated with a potash production process utilizing a brine from a mining operation. As seen in FIG. 3, the brine is directed to a multi-effect evaporator (MEE) train 150. The multi-effect evaporator train 150 concentrates the brine and in the evaporation process, sodium chloride is crystallized and separated from the brine concentrated in the multi-effect evaporator train. Sodium chloride crystals are removed from the concentrated brine until the concentration of sodium and potassium almost reach a saturation point.

Thereafter, the concentrated brine is directed to a solids-liquid separator 152 that is located downstream from the MEE train 150. Here calcium sulfate seed is separated, in this case through a settling process, in the solids-liquid separator 152.

A calibrated amount of dilution water is added to the concentrated brine and the concentrated brine, including the dilution water, is cooled in a crystallization flash train, referred to in the drawings as KCl flash train 154. The KCl flash train 154 produces high grade and low grade potassium chloride at different stages. Residual cold brine produced by the KCl flash train 154 is recycled to the MEE train 150. The recycling of the cold brine continues until the accumulation of impurities therein requires a part of the cold brine to be purged and subjected to additional treatment or otherwise appropriately disposed of.

Low grade potassium chloride crystals produced by the last stage of the KCl flash train 154 is used as a potassium source for the potassium sulfate production process. Note that the potassium chloride crystals from the KCl flash train 154 are directed through line 156 to the block denoted "KCl brine or suspension preparation" in FIG. 3. Thus, the potassium chloride crystals produced the KCl flash train 154 can, in some cases, provide all or substantially of the potassium source required to produce the potassium sulfate. In other cases, the potassium chloride crystals produced by the KCl flash train 154 may simply augment an external source of potassium being supplied to the potassium sulfate production process.

Further, the process of FIG. 3 employs thermal integration. Waste steam at approximately 70° C. from the MEE train 150 can be used to drive the sodium chloride crystallizer 128. Moreover, the waste stream may be employed in a double (or more) effect arrangement to also drive the glaserite crystallizer 110 or at least augment an external supply of steam being supplied to the glaserite crystallizer. Note the line denoted "recovered" steam extending from the sodium chloride crystallizer 128 to the glaserite crystallizer 110 in FIG. 3.

The process shown in FIG. 4 is also an integrated process involving the production of potassium sulfate and potash. This process is similar in many respects to the process shown in FIG. 3. However, there are a number of differences. First, the sodium chloride crystallizer 128, found in the FIG. 3 process has been eliminated. Secondly, permeate or filtrate from the anion segregation unit or nanofiltration unit 122 is directed via line 200 into the MEE train 150. As discussed above, the MEE train 150 concentrates the brine from the mining operation and in the process produces sodium chloride crystals that are separated. Thirdly, waste steam from the MEE train 150 is directed through a line 202 to the glaserite crystallizer 110 for driving the same. In some cases, the waste energy from the MEE train 150 may be sufficient to drive the glaserite crystallization process. In other cases, external steam may be required for the glaserite crystallizer 110 and in that case, the waste stream from the MEE train 150 simply augments the power requirements and reduces energy costs. Finally, the cold brine (or any of the intermediate brines formed into the flash train) from the KCl flash train 154 is not only recycled to the MEE train 150, but a portion thereof is directed through line 204 to the glaserite crystallizer 110.

Figure 5:
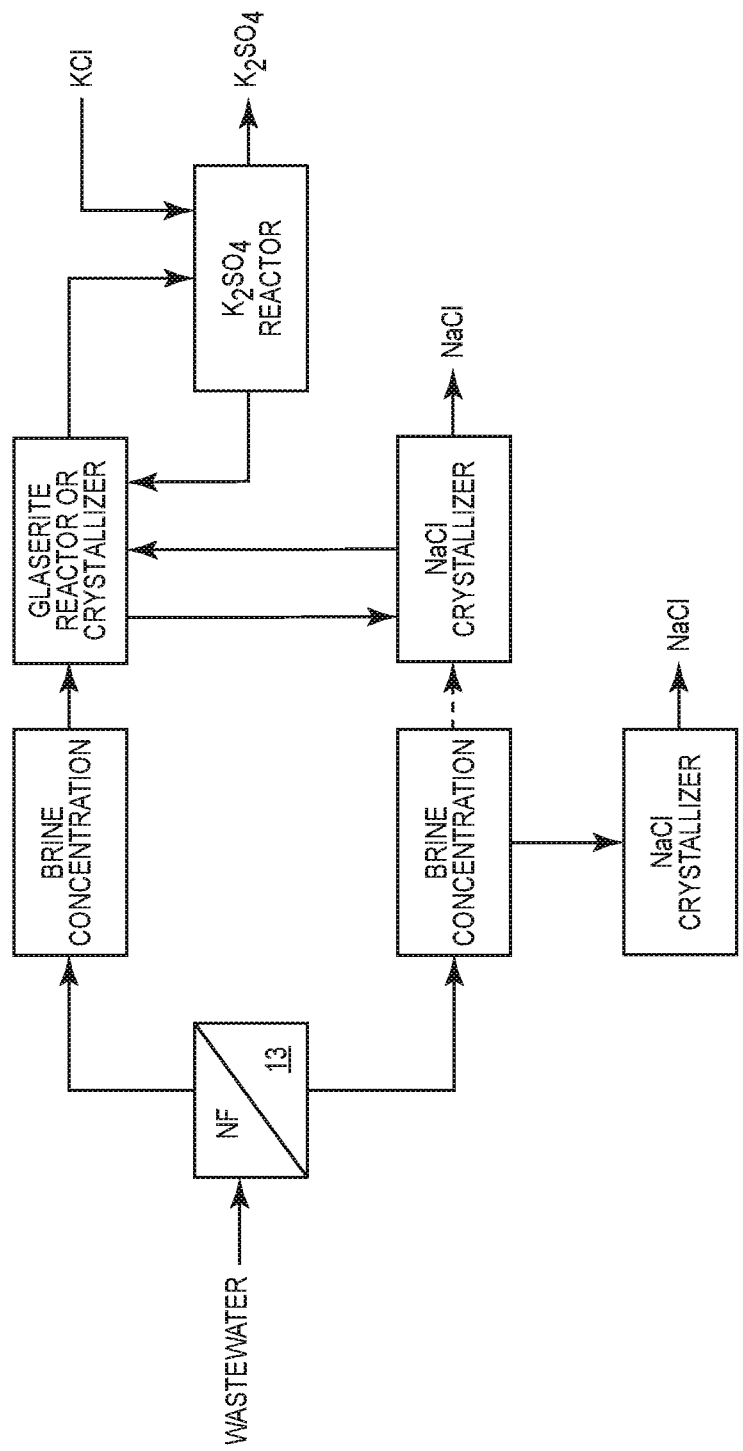
FIG. 5 is a schematic illustration showing another alternative embodiment for producing potassium sulfate and sodium chloride crystals.

FIG. 5 is another alternative embodiment for producing potassium sulfate, as well as sodium chloride, from a wastewater stream that includes sodium and sulfate. Depending on the makeup of the wastewater stream, it may be beneficial (and optimal) to employ a membrane separation unit, such as a nanofiltration (NF) membrane 13 upstream of a concentrating process. Where such a nanofiltration membrane is used, it may be unnecessary to employ a mirabilite crystallizer as subsequently discussed in other processes herein. With particular reference to FIG. 5, a wastewater stream is directed into a membrane separation unit. In the FIG. 5 embodiment, a nanofiltration membrane is employed. The nanofiltration membrane produces a reject stream and a permeate stream. The reject stream is delivered to a concentrating unit where a brine concentration process takes place. This yields a first brine stream or slurry that is directed to a downstream glaserite reactor or glaserite crystallizer. A potassium liquor from a downstream operation is mixed with the first brine stream or slurry in the glaserite reactor to form glaserite crystals. In cases where a glaserite crystallizer is used, the potassium liquor and first brine stream or slurry is mixed in the glaserite crystallizer or at a point upstream of the glaserite crystallizer. The glaserite crystals are separated from the potassium liquor and directed to the downstream potassium sulfate reactor. A potassium source is directed into the potassium sulfate reactor and is mixed with the glaserite crystals to form potassium sulfate crystals. Various potassium sources may be employed but in the embodiment shown in FIG. 5, the potassium source is KCl. The resulting potassium sulfate crystals are separated from the potassium liquor. To provide a potassium source to the glaserite reactor or the glaserite crystallizer, the potassium liquor from the potassium sulfate reactor is directed to the glaserite reactor or glaserite crystallizer and provides the potassium liquor used in the process.

When a glaserite reactor is employed in the FIG. 5 embodiment, the potassium liquor from the glaserite reactor is directed to a sodium chloride crystallizer that produces the sodium chloride crystals. The sodium chloride crystallizer will produce a mother liquor that is depleted in sodium chloride and this mother liquor is recycled back to the glaserite reactor. When a glaserite crystallizer is used in many of the processes disclosed herein, it is advantageous to provide an anion segregation unit between the glaserite crystallizer and the sodium chloride crystallizer. An example of an anion segration unit, as already noted herein, is a nanofiltration unit. In any event, when the glaserite crystallizer is employed in the FIG. 5 embodiment, the potassium liquor or concentrate produced in the glaserite crystallizer is directed to a nanofiltration membrane unit that is operatively interconnected between the glaserite crystallizer and the sodium chloride crystallizer. The nanofiltration unit or anion segregation unit produces a reject or retentate that is enriched in sulfate and which is recycled back to the glaserite reactor. The nanofiltration unit or the anion segregation unit produces a filtrate or permeate that is typically depleted in sulfate and which is directed to the sodium chloride crystallizer which form the sodium chloride crystals.

The permeate stream produced by the nanofiltration membrane 13 is also subjected to a concentration process. This is referred to in FIG. 5 as brine concentration. This produces a second brine stream. In one embodiment, the second brine stream is directed to a sodium chloride crystallizer that produces sodium chloride crystals that are separated. As an option, the mother liquor produced by the glaserite reactor can be directed to the same sodium chloride crystallizer. Typically the liquor transferred from the glaserite reactor to the sodium chloride crystallizer will be relatively rich in sodium chloride and the liquor returned from the sodium chloride crystallizer to the glaserite reactor would typically reflect a reduction in concentration of the sodium chloride.

Figure 6:
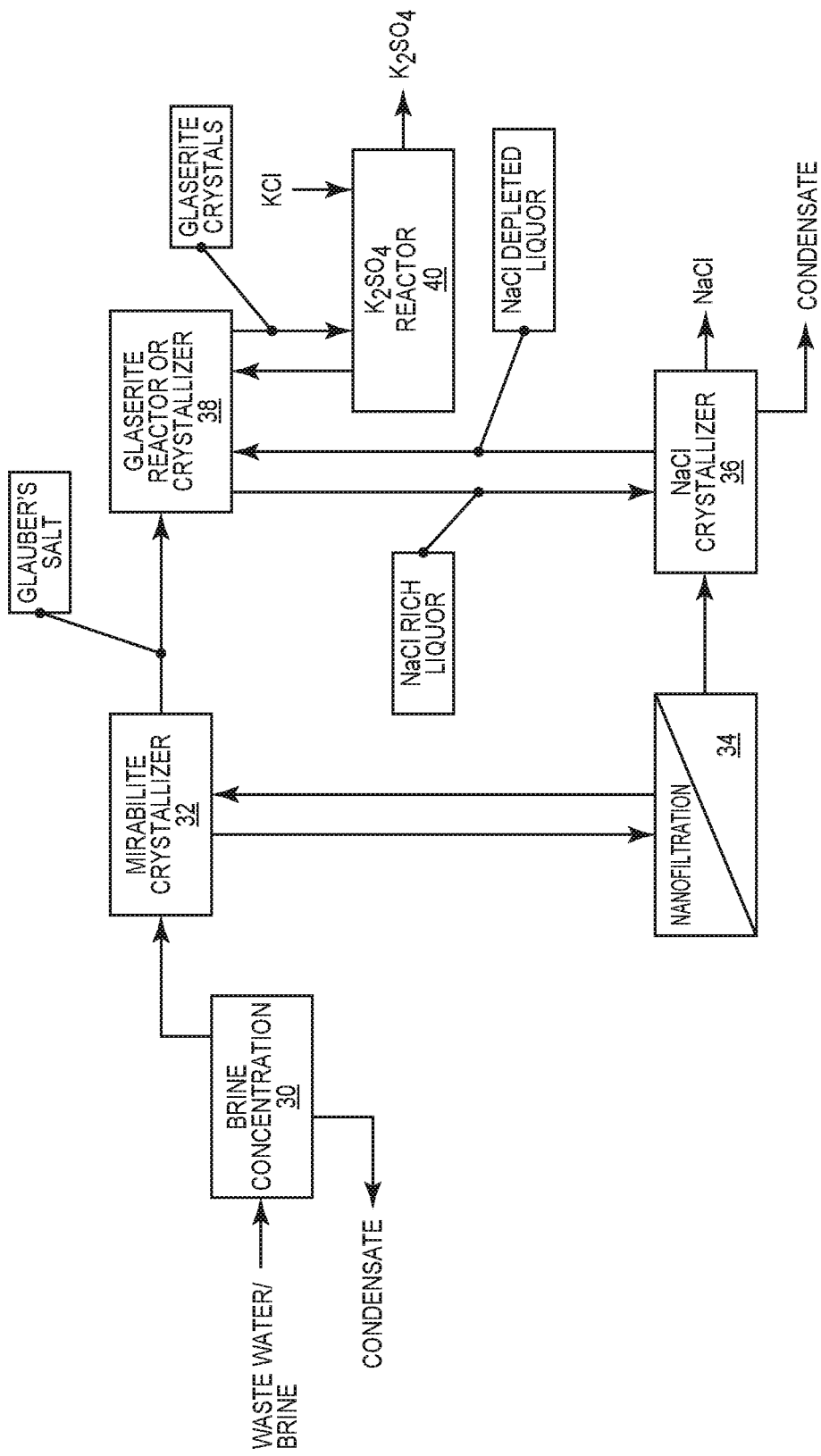
FIG. 6 is a schematic illustration of a process for producing potassium sulfate and sodium chloride crystals employing a mirabilite crystallizer upstream of a glaserite reactor.

FIG. 6 illustrates another process for treating a wastewater stream containing sodium and sulfate and which produces potassium sulfate and sodium chloride. Wastewater is directed to a concentrator (such an evaporator) 30. Concentrator 30 concentrates the wastewater into a brine containing sodium, chloride and sulfate together with various minor components and produces a condensate. The condensate may be released. The brine is then directed to a cooling mirabilite crystallizer 32. Therein the brine is cooled to form mirabilite ($Na_2SO_4.10H_2O$) crystals and a mirabilite mother liquor partly depleted in sulfate and partly enriched in chloride.

The mirabilite crystals are separated from the mirabilite mother liquor and directed to a glaserite reactor 38. There the mirabilite crystals are mixed with a potassium source. Mirabilite crystals react with the potassium to form glaserite ($K_3Na(SO_4)_2$) crystals. Potassium mixed with the mirabilite crystals may be sourced from various sources. A potassium-rich liquor is present in a downstream reactor which, in this case, is a potassium sulfate reactor 40. The potassium-rich liquor in the potassium sulfate reactor 40 is recycled to the glaserite reactor 38 and mixed with the mirabilite crystals to form glaserite crystals and a resulting liquor represented, for example, by a point (G) on the phase diagram of FIG. 9.

Glaserite crystals are separated from the glaserite reactor mother liquor and are directed to the potassium sulfate reactor 40. A source of potassium, such as potassium chloride (KCl) is added to the potassium sulfate reactor 40 and reacts with the glaserite crystals to form potassium sulfate ($K_2SO_4$) and the potassium-rich liquor which is directed from the potassium sulfate reactor 40 to the glaserite reactor 38. In one embodiment, the potassium chloride added to the potassium sulfate reactor 40 is in the form of a slurry or suspension. In one exemplary process, the sodium and sulfate introduced as a part of the glaserite is kept in solution by limiting the sodium concentration below the glaserite saturation, shown as point (P) on the phase diagram of FIG. 9.

Due in part to recycling the potassium-rich liquor from the potassium sulfate reactor 40 to the glaserite reactor 38, the liquor in the glaserite reactor 38 may become rich in sodium ions and chloride ions. To reduce the concentration of sodium and chloride in the glaserite reactor liquor, the liquor in the glaserite reactor 38 is directed to a sodium chloride evaporative crystallizer 36. Therein the liquor from the glaserite reactor 38 is heated to form sodium chloride crystals. The sodium chloride crystallization process produces a condensate and a mother liquor. The mother liquor produced by the sodium chloride crystallizer 36 is now depleted in sodium and chloride. The sodium chloride crystals are separated from the liquor produced by the sodium chloride crystallizer 36 and the liquor is recycled from the sodium chloride crystallizer to the glaserite reactor 38.

Meanwhile, the liquor from the mirabilite crystallizer 32 is subjected to an anion segregation unit or a filtration unit. In one embodiment, the filtration unit is a nanofiltration unit 34. The filtration unit filters the mirabilite crystallizer liquor, forming a permeate stream and a reject stream. The nanofiltration unit 34 will typically reject or retain sulfate while allowing sodium and chloride ions to pass through the nanofiltration unit. In the process shown in FIG. 6, the reject stream is recycled back to the mirabilite crystallizer 32 while the permeate stream produced by the filtration unit is directed to the sodium chloride crystallizer 36. In a substantial number of applications, the mother liquor from the mirabilite crystallizer will include sulfate, sodium and chloride, and even other impurities. The function of the anion segregation unit or the nanofiltration unit 34 is to effectively separate the sulfate from the sodium, chloride and other impurities such that the sulfate can be efficiently used to produce the potassium sulfate. Thus, the reject or retenate from the anion segregation is typically rich in sulfate and is recycled for use in producing potassium sulfate. The anion segregation unit or the nanofiltration unit 34 preferably permits sodium and chloride to pass in the permeate stream which is directed to the sodium chloride crystallizer 36.

In some embodiments, additional purges may be drawn from the mirabilite crystallizer and/or the sodium chloride crystallizer and/or the permeate stream and sent to a back end zero liquid discharge (waste) crystallizer. Therein those purges may be treated for disposal.

Figure 7:
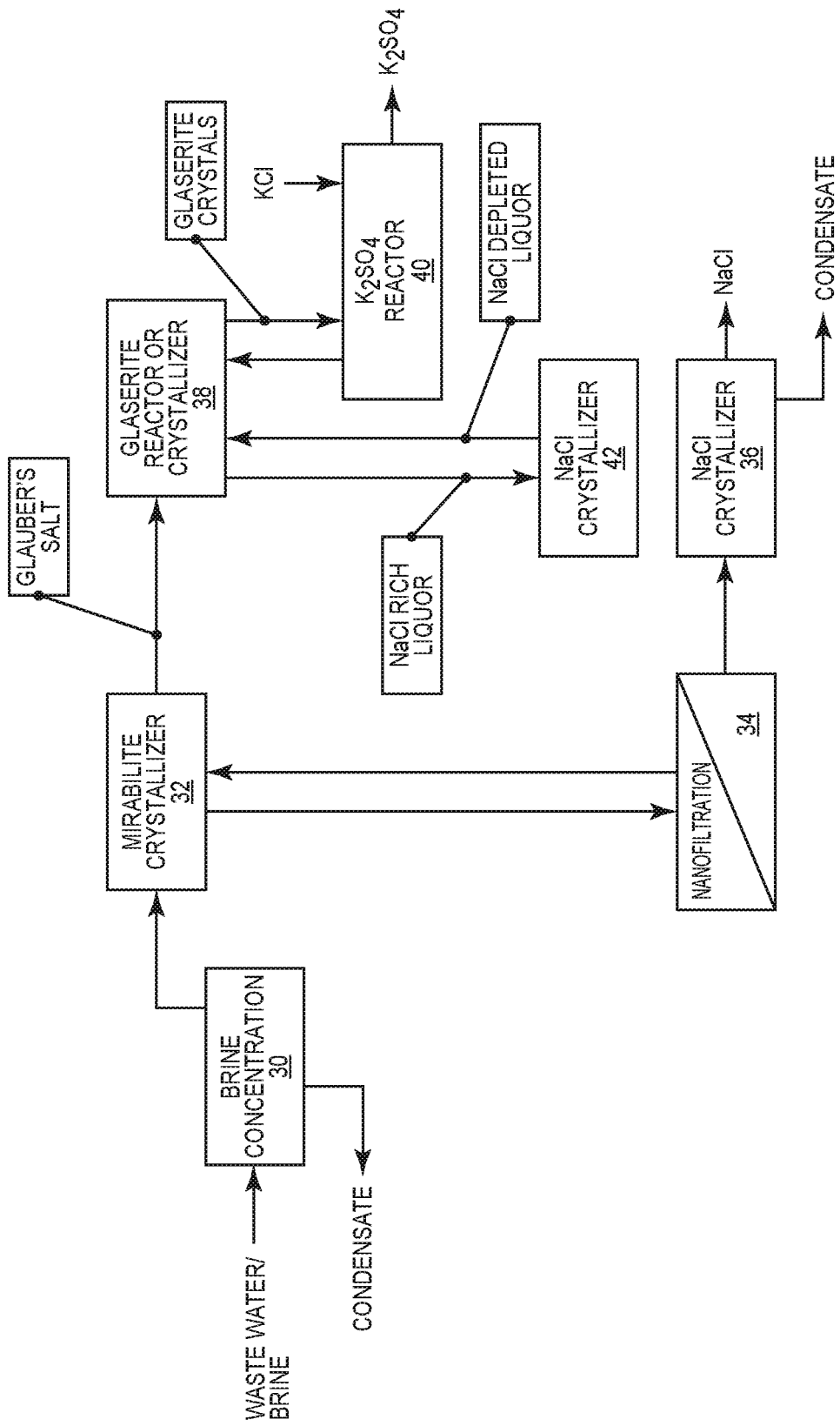
FIG. 7 is a schematic illustration of a process for producing potassium sulfate and sodium chloride that in an alternate embodiment with respect to the FIG. 6 process.
Figure 8:
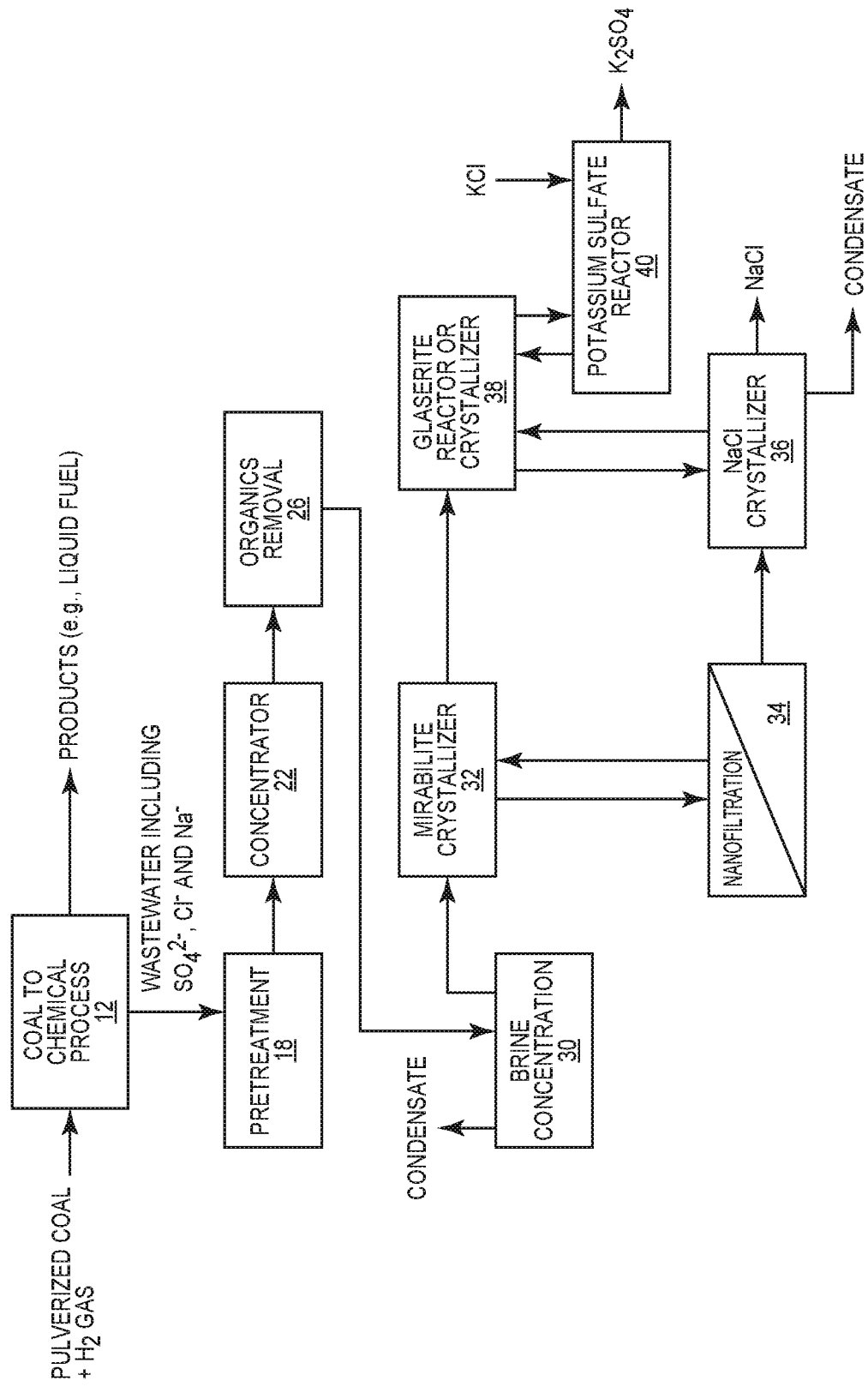
FIG. 8 is a schematic illustration of a coal-to-chemical or coal-to-liquid process that integrates a process for treating a wastewater stream from the coal-to-chemical or coal-to-liquid process and which produces potassium sulfate and sodium chloride crystals.

The above discussion addresses the use of a glaserite reactor in the FIG. 6 embodiment. In the embodiments of FIGS. 6, 7 and 8, as the drawings indicate, a glaserite crystallizer can be used in lieu of the glaserite reactor in order to produce the glaserite crystals. When a glaserite crystallizer is employed, in many cases it is preferable to provide an anion segregation unit, such as a nanofiltration unit, between the glaserite crystallizer and the sodium chloride crystallizer. Thus, when a nanofiltration unit is employed, the potassium liquor or mother liquor produced by the glaserite crystallizer is directed to the nanofiltration unit. The nanofiltration unit produces a reject stream that is recycled to the glaserite crystallizer and a permeate stream which is directed to the sodium crystallizer which produces the sodium chloride crystals. It is appreciated that the reject stream recycled back to the glaserite crystallizer is enriched in sulfate while the permeate stream directed to the sodium chloride crystallizer is generally depleted in sulfate.

FIG. 7 depicts an alternate process that is similar in many respects to the process shown in FIG. 6. There may be situations in which it is feasible and advantageous to employ two separate sodium chloride evaporative crystallizers. This is the case for the FIG. 7 embodiment. This process includes two sodium chloride crystallizers 36 and 42. Depending on the makeup of the wastewater or brine being treated, and particularly focusing on the $Cl^-/SO_4^{2-}$ ratio and other solution impurities and the potassium sulfate purity target, it may be preferable to employ the two sodium chloride crystallizers 36 and 42 as shown in FIG. 7. In some embodiments, consideration can be given to employing a nano-filtration unit between the glaserite reactor 38 and the sodium chloride crystallizer 42 to improve the $Cl^-/SO_4^{2-}$ ratio of the influent to the sodium chloride crystallizer in order to improve its efficiency similarly to the process described in FIG. 1. This applies also between unit 38 and 36 in FIG. 6.

The exemplary processes shown in FIGS. 1-7 may be incorporated into methods for treating wastewater produced in various processes. One type of wastewater that may be treated utilizing the process of FIGS. 1-7 is wastewater from coal-to-chemicals or coal-to-liquid processes. An example process of this type of treatment is shown in FIG. 8.

Figure 9:
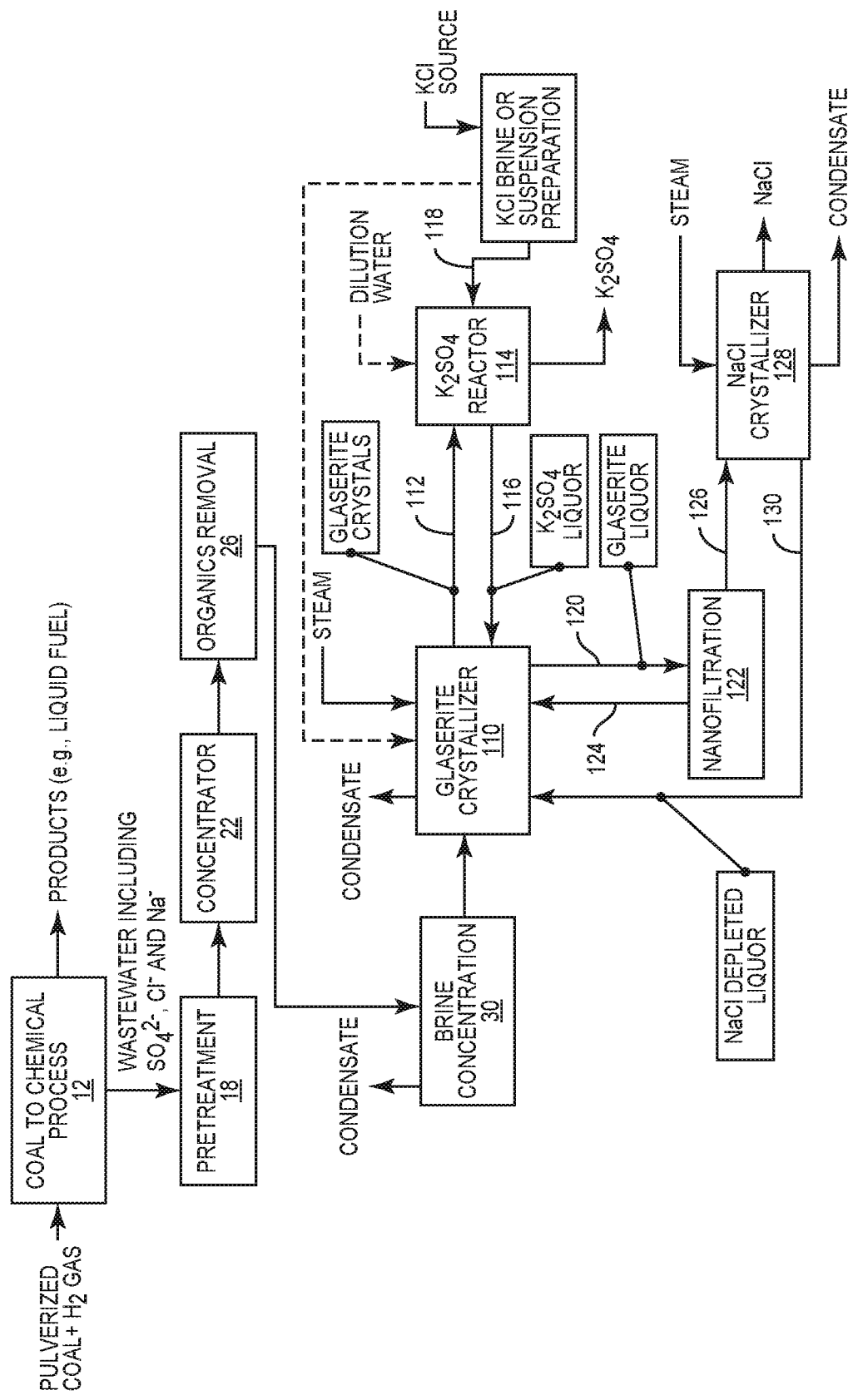
FIG. 9 is another schematic illustration of a coal-to-chemical or coal-to-liquid process that integrates a process for treating a wastewater stream from the coal-to-chemical or coal-to-liquid process and which produces potassium sulfate and sodium chloride crystals.
Figure 10:
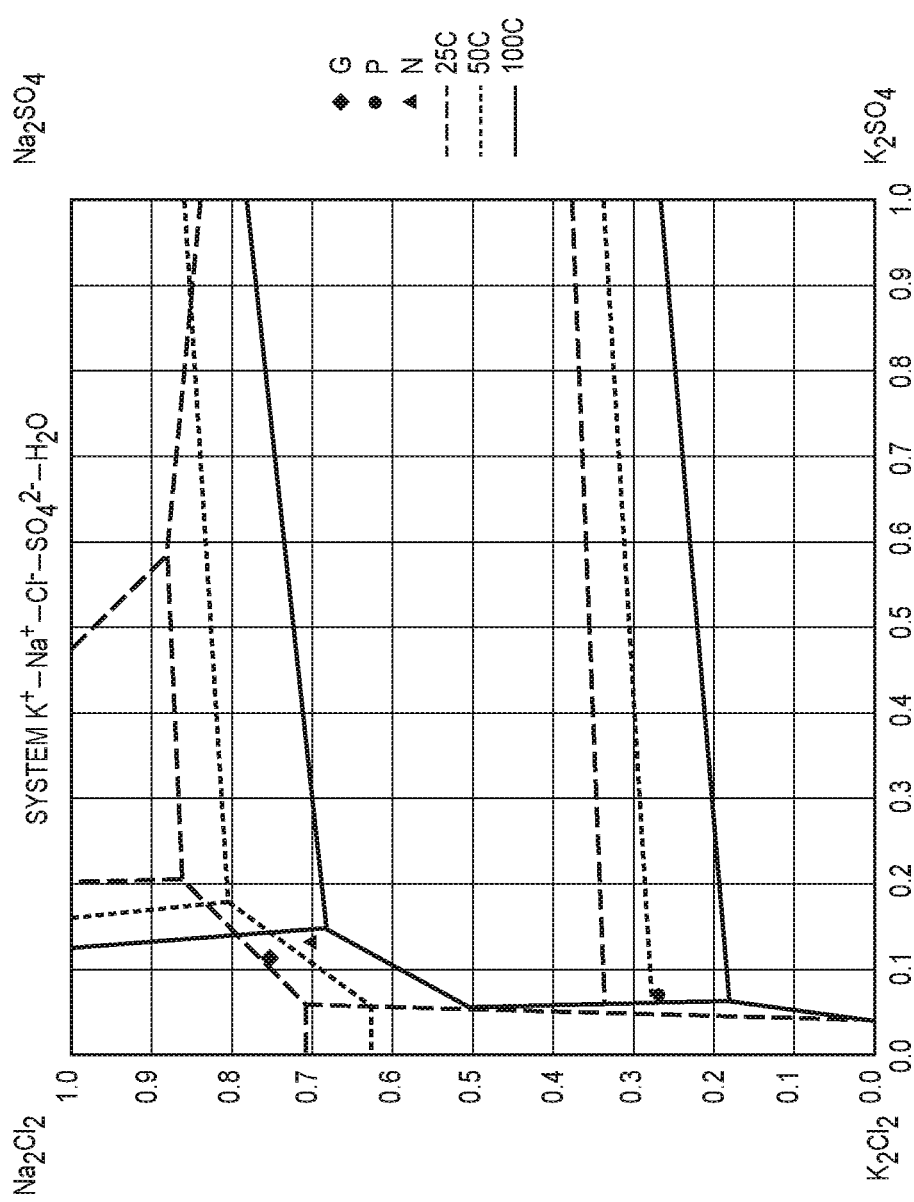
FIG. 10 is a phase diagram for several salts that may be recovered utilizing the processes described herein.

Turning to FIGS. 8 and 9 of the drawings, a coal-to-chemical or coal-to-liquid process produces useful products, such as, for example, fuels or plastics. Typically, a coal-to-chemical or coal-to-liquid process 12 gasifies coal to produce syngas. In one example, this gasification occurs when pulverized coal and hydrogen gas, as well as recycled coal-derived liquids are mixed with a catalyst to produce a crude gas. This may occur under pressurized gasification conditions. Crude gas may then be refined into synthetic gasoline, diesel, or other hydrocarbon products. In one refining process, the crude gas is contacted with water to cool the gas. The cooling allows a product to be obtained with a gas and liquid phase product. Oil may be separated from the liquid phase, leaving coal gasification wastewater. The wastewater may then be subjected to supercritical conditions and contacted with oxidants, such as organics and ammonia nitrogen, to obtain synthesis gas. After gasification, the products produced may be subjected to additional treatment. For example, in some indirect coal conversion methods, after gasification, the syngas is subjected to Fischer-Tropsch Synthesis, which produces products as well as steam and tail gas that may be used to generate electric power. Wastewater is produced in various places along a coal-to-chemical or coal-to-liquid process and contains alkali metals (typically sodium), sulfate, and chloride. During the gasification stage, wastewater is produced when water is used to convey slag and fly ash from gasifier, to scrub particulates and chlorides from the syngas, and to process condensate from cooling the syngas. This wastewater typically contains chloride, ammonia, cyanides, and fly ash. Wastewater is also produced in Fischer-Tropsch Synthesis, which typically contains oxygenated hydrocarbons and toxic metals. Additional processing of the Fischer-Tropsch Synthesis may produce additional wastewaters with organics, cyanides, ammonia, and phenol contaminants. Although these are examples of coal-to-chemical or coal-to-liquid processes, one of skill in the art appreciates that the methods described herein may be used to treat wastewater from any coal-to-chemical or coal-to-liquid process, or any wastewater, waste brine or production brine from other processes, especially those sulfate rich brines discharged in the salt production industry.

With respect to the FIG. 8 embodiment, wastewater generated from the conversion of coal-to-chemicals or fuel in some embodiments is directed to a pretreatment process or processes 18. Pretreatment process 18 removes various contaminants and may include one or more traditional pretreatment methods. For example, pretreatment may include pH adjustment, membrane filtration (such as, for example, reverse osmosis membrane filtration), ion exchange, chemical treatment such as chemical softening and/or precipitation, or combinations thereof. One skilled in the art appreciates that pretreatment is not used in some embodiments and, in embodiments where pretreatment is utilized, the type of pretreatment may vary due to the contaminants present in the water.

After the wastewater is pretreated, it is directed to a concentrator 22. Concentrator 22 removes water and potentially some impurities that may be further treated or released. The remaining contaminants, meanwhile, are concentrated. While various forms of concentrators may be used with these methods, in some embodiments, the concentrator 22 is an evaporator that yields blowdown that includes the concentrated wastewater with contaminants. In other embodiments, the concentrator 22 may be a reverse osmosis unit that yields a permeate and a reject stream that includes the concentrated water with contaminants. In some embodiments using reverse osmosis units, the permeate may be recycled back to the coal-to-chemical or coal-to-liquid process.

The composition of a typical wastewater exiting the concentrator 22 may include but is not limited to:
sodium ($Na^+$): 0.1-10%, and more often 5-10%
sulfate ($SO_4^2$): 0.1-10%, and more often 7-10%
chloride (Cr): 0.1-6%, and more often 3-6%
Other constituents such as: silica, organics, potassium, nitrate, ammonia: 1-2%

In some embodiments, concentrated wastewater from the concentrator 22 is directed to an organics removal process 26. Various processes may be utilized to remove organics, such as, for example, filtration, adsorption, chemical treatment, and biological treatment. In one embodiment, the organics removal process 26 comprises treating the concentrated wastewater with activated carbon. One of skill in the art appreciates that organics removal is optional and its use depends on the contaminants found in the wastewater.

After removing organics, the wastewater may be treated pursuant to the method shown in FIG. 6, for example. In particular, the wastewater is treated by a brine concentration unit 30 to remove additional water and potentially volatile compounds as condensate and produce a concentrated brine. Concentrated brine from the brine concentration unit 30 is sent to a mirabilite crystallization unit 32, where it is subjected to a cooling crystallization process to produce mirabilite crystals. Thereafter, the mirabilite crystals produced from the mirabilite crystallization unit 32 are separated from the mother liquor and the raw, melted or dissolved mirabilite crystals are directed to a glaserite reactor 38. In the glaserite reactor 38, the mirabilite crystals are reacted with a potassium-rich liquor to form glaserite. The glaserite is separated from liquor and directed to a potassium sulfate reactor 40. Therein, it is mixed with potassium chloride. The reaction forms potassium sulfate crystals and a sodium and chloride-rich purge. The potassium sulfate crystals are separated from the sodium and chloride-rich purge. The purge is returned to the glaserite reactor 38. As sodium and chloride accumulate in the potassium liquor in the glaserite reactor, the liquor is directed to a sodium chloride crystallizer 36. Therein, sodium chloride is crystallized and the remaining liquor, now depleted from sodium and chloride, is recycled back to the glaserite reactor. Meanwhile, the purge from the mirabilite crystallizer 32 may be filtered via a nanofiltration unit 34, with the reject stream recycled to the mirabilite crystallizer 32. The permeate from the nanofiltration unit 34 is directed to the sodium chloride crystallizer 36, or a separate sodium chloride crystallizer, or partly purged. Occasionally, remaining purge in the chloride salt crystallizer may be directed to a back-end crystallizer to further treat and purge contaminants. The process produces, inter alia, salable quality sulfate and chloride salts, which may be offered for sale or utilized in other processes.

By treating the wastewater produced in the coal-to-chemicals process via the exemplary process shown in FIG. 8, as well as the methods described herein, the amounts of contaminants that are released to the environment are substantially reduced. Instead of wasting large amounts of water, the water is treated and released safely. Additionally, the methods disclosed herein provide beneficial pure salt products from the waste stream that may be sold or used in other processes. The methods optimize salt recovery and reduce the operating costs and waste volume.

The coal-to-chemical or the coal-to-liquid process shown in FIG. 8 can be modified to include any one of the processes shown in FIGS. 1-4. For example, FIG. 9 shows a coal-to-chemical or coal-to-liquid process that employs the basic process shown in FIG. 1 and described above. That is, the wastewater produced by the conversion of coal-to-chemical or coal-to-liquid can be concentrated to form a brine that includes sodium sulfate. This brine containing the sodium sulfate can be directed into the glaserite crystallizer 110 shown in FIGS. 1-4 and the processes shown therein can be employed to produce potassium sulfate by employing the sodium sulfate and a potassium chloride source.

Although the present methods and processes have been shown and described in considerable detail with respect to only a few/particular exemplary embodiments thereof, it should be understood by those skilled in the art that it is not intended to limit the methods or processes to the embodiments since various modifications, omissions, and additions may be made to the disclosed embodiments without materially departing from the novel teachings and advantages described herein.

EXAMPLE

In this example, a source of sodium sulfate and a source of potassium chloride is used to produce potassium sulfate and sodium chloride crystals according to the process shown in FIG. 1, for example.

| THE SULFATE SOURCE | |
|---|---|
| Glauber Salt Feed | 2.30 t/h (tons per hour) |
| $Na_2SO_4 \cdot 10H_2O$ | 95.50 wt % |
| NaCl | 0.14 wt % |
| $CaSO_4$ | 0.03 wt % |
| $MgCl_2$ | 0.03 wt % |
| Moisture | 4.30 wt % |
| THE POTASSIUM SOURCE | |
| KCl Feed | 1.1 t/h |
| KCl | 95.00 wt % |
| NaCl | 3.70 wt % |
| $MgCl_2$ | 0.40 wt % |
| $CaSO_4$ | 0.40 wt % |
| Insolubles | 0.50 wt % |

The sulfate source can be prepared by melting the Glauber's salt (at approximately 35-55° C.) using waste steam from the glaserite crystallizer or the sodium chloride crystallizer. Potassium chloride brine can be prepared by using clean condensate. In the alternative, a mixture of clean water and mother liquor can be used. In this alternative approach, impurities can be removed from the mixture by adjusting the pH of the mixture to above 10 to precipitate hardness (calcium and magnesium) as hydroxide, carbonate or sulfate compounds. Here a softening reagent, such as caustic soda, soda ash or lime, can be mixed with the mixture to remove the hardness. The melted Glauber's salt is fed to the glaserite crystallizer and mixed with recycled mother liquor from the nanofiltration unit 122, as well as the potassium liquor received from the downstream potassium sulfate reactor. This will typically generate approximately 1.3 t/h of glaserite crystals at 40-45° C. The mother liquor produced by the glaserite reactor typically contains about 33.5% of dissolved ionic components, mainly as chloride salts (30 g/100 g $H_2O$ of NaCl and 11.4 g/100 g $H_2O$ of KCl). Sulfate salts in the mother liquor typically range from about 2.4 g/100 g $H_2O$ for potassium salts to 6.4 g/100 g $H_2O$ for sodium salts.

Mother liquor produced by the glaserite crystallizer is pumped under pressure through the nanofiltration unit at a rate of approximately 15 to 30 t/h with a permeate yield of 25 to 50% and operating typically around 15 to 40 barg. Also in this example, about 0.4 to 1 t/h of dilution water is added to the mother liquor from the glaserite crystallizer to avoid saturation due to the sulfate concentration gradient. The nanofiltration unit produces a reject stream where the concentration in sulfate salts increases to about 3 to 10 g/100 g$H_2O$ while the chloride salt concentration is only slightly affected based on the polarization effect and Donnan effect in the nanofiltration unit. A typical permeate stream produced by the nanofiltration unit contains less than 0.5 g/100 g $H_2O$ of accumulated sulfate salts. The permeate stream is sent to the sodium chloride crystallizer at a rate of about 7 t/h. At this stage, a typical sodium-to-potassium ratio is about 2.5 to 2.7 and decreases down to about 1.1-1.3 after crystallization of about 0.9 t/h of NaCl at 60 to 80° C. in the sodium chloride crystallizer. This range will vary depending on the applied temperature in the sodium chloride crystallizer. The evaporation rate generally reaches about 2.3-2.6 tons per ton of potassium sulfate produced. The mother liquor produced by the sodium chloride crystallizer and recycled to the glaserite crystallizer typically contains about 35.3% of dissolved ionic components, mainly as chloride salts (approximately 29.2 g/100 g $H_2O$ of NaCl and approximately 24.8 g/100 g $H_2O$ of KCl). Sulfate salts in the mother liquor produced by the sodium chloride crystallizer typically reaches about 0.8-1 g/100 g $H_2O$ for potassium and sodium salts.

The glaserite crystals are converted to potassium sulfate in the potassium sulfate reactor operating around 25 to 35° C. as a typical example. Dilution water may be required at a rate of 3-3.3 tons per hour in order to produce substantially pure potassium sulfate crystals. The mother liquor produced by the potassium sulfate reactor is recycled at a rate of about 4-4.4 t/h to the glaserite crystallizer and induces about 1.5-1.9 t/h evaporation per ton of potassium sulfate produced. The mother liquor produced by the potassium sulfate reactor typically contains about 32% of dissolved ionic components mainly as chloride salts (9 g/100 g $H_2O$ of NaCl and 25 g/100 g $H_2O$ of KCl). Sulfate salts in the mother liquor produced by the potassium sulfate reactor typically ranges from about 2.4 g/100 g$H_2O$ for potassium salts to 0.9 g/100 g$H_2O$ for sodium salts.

In this example, it is contemplated that the process produces about 1.25 t/h of potassium sulfate with a purity of about 50-52% as potassium oxide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of producing potassium sulfate comprising:
   directing a sodium sulfate source to a glaserite crystallizer;
   directing a liquor containing potassium sulfate from a downstream potassium sulfate reactor to the glaserite crystallizer and mixing the liquor containing the potassium sulfate with the sodium sulfate source;
   crystallizing glaserite in the glaserite crystallizer to form glaserite crystals and a mother liquor;
   separating the glaserite crystals from the mother liquor;
   directing the glaserite crystals to the downstream potassium sulfate reactor;
   directing a potassium chloride source to the potassium sulfate reactor and mixing the potassium chloride source with the glaserite crystals and precipitating potassium sulfate crystals;
   separating the potassium sulfate crystals from the liquor containing potassium sulfate;
   directing the mother liquor from the glaserite crystallizer to a nanofiltration unit and producing a reject or retentate stream rich in sulfate and a filtrate or permeate stream depleted in sulfate;
   recycling the reject or retentate stream to the glaserite crystallizer and combining the reject or retentate stream with the sodium sulfate source and the liquor containing the potassium sulfate in the glaserite crystallizer; and
   directing the filtrate or permeate stream to a sodium chloride crystallizer and producing sodium chloride crystals.

2. The method of claim 1 wherein potassium sulfate is produced in the absence of a mirabilite crystallization process upstream of the glaserite crystallizer.

3. The method of claim 1 including subjecting the mother liquor produced by the glaserite crystallizer to a treatment process prior to the mother liquor reaching the anion segregation unit wherein the treatment process reduces the tendency of the mother liquor to scale or clog the anion segregation unit.

4. The method of claim 1 wherein the sodium sulfate source comprises sodium sulfate crystals or a sodium sulfate brine or a sodium sulfate slurry; and wherein the potassium chloride source comprises potassium chloride crystals or a potassium chloride brine or a potassium chloride slurry.

5. The method of claim 1 wherein the sodium sulfate source is Glauber's salt and the method includes melting the Glauber's salt and directing the melted Glauber's salt to the glaserite crystallizer.

6. The method of claim 1 wherein the potassium chloride is mixed with a mixture of water and one or more liquors produced by the process and wherein the method includes subjecting the mixture to a softening process where hardness in the mixture is reduced.

7. The method of claim 1 wherein the sodium chloride crystallizer comprises a solar evaporation pond, basin or other facility and the method includes directing the permeate stream from the anion segregation unit to the solar evaporation pond, basin or facility.

8. A method for producing potassium sulfate from a waste stream, comprising:
   concentrating the waste stream to form a brine or a slurry;
   crystallizing mirabilite from the brine or slurry in a mirabilite crystallizer to form mirabilite crystals and a mirabilite crystallizer liquor;
   separating the mirabilite crystals from the mirabilite crystallizer liquor;
   mixing the mirabilite crystals with a potassium liquor;
   producing or forming glaserite crystals from the mirabilite crystals and potassium liquor in a glaserite reactor or a glaserite crystallizer;
   separating the glaserite crystals from the potassium liquor;
   directing the glaserite crystals to a potassium sulfate reactor;
   mixing a potassium source with the glaserite crystals in the potassium sulfate reactor to form potassium sulfate crystals and the potassium liquor;
   recycling the potassium liquor from the potassium sulfate reactor to the glaserite reactor or glaserite crystallizer;
   filtering the mirabilite crystallizer liquor to form a filtrate or permeate depleted in sulfate and a retentate or reject rich in sulfate;
   recycling the retentate or reject stream to the mirabilite crystallizer;
   directing the filtrate or permeate stream to a sodium chloride crystallizer and crystallizing sodium chloride crystals; and
   separating the sodium chloride crystals.

9. The method of claim 8 wherein the glaserite crystals are formed in the glaserite reactor and the method includes directing the potassium liquor from the glaserite reactor to the sodium chloride crystallizer.

10. The method of claim 9 wherein the sodium chloride crystallizer produces a concentrate that includes potassium and wherein the method includes directing at least a portion of the concentrate from the sodium chloride crystallizer to the glaserite reactor and mixing the concentrate with the mirabilite crystals.

11. The method of claim 8 wherein the potassium source is potassium chloride and wherein potassium chloride is added to the potassium sulfate reactor in the form of a slurry or a brine.

12. The method of claim 8 wherein the glaserite crystals are produced in the glaserite crystallizer; and wherein the method includes directing the potassium liquor from the glaserite crystallizer to a nanofiltration unit and producing a second reject stream and a second permeate stream;
   recycling the second reject stream to the glaserite crystallizer; and
   directing the second permeate stream to the sodium chloride crystallizer.

13. A method for producing potassium sulfate from a wastewater stream containing sodium and sulfate, comprising:
   directing the wastewater stream to a membrane separation unit and producing a reject stream and a permeate stream;
   concentrating the reject stream to form a first brine solution or a slurry;
   directing the first brine solution or slurry to a glaserite reactor;
   mixing potassium liquor with the first brine solution or slurry in the glaserite reactor and producing glaserite crystals;
   separating the glaserite crystals and directing the glaserite crystals to a potassium sulfate reactor;
   mixing a potassium source with the glaserite crystals to form potassium sulfate crystals;

separating the potassium sulfate crystals;
wherein the potassium source mixed with the glaserite crystals in the potassium sulfate reactor forms the potassium liquor that is mixed with the first brine stream or slurry in the glaserite reactor;
concentrating the permeate stream to form a second brine stream or a second slurry;
directing the second brine stream or second slurry to a sodium chloride crystallizer and crystallizing sodium chloride crystals; and
separating the sodium chloride crystals.

14. The method of claim 13 wherein in the process of producing glaserite crystals in the glaserite reactor a sodium chloride liquor is formed and the method includes directing the sodium chloride liquor from the glaserite reactor to the sodium chloride crystallizer.

15. The method of claim 13 wherein the potassium source is in the form of a slurry or a brine and wherein the slurry or brine is mixed with the glaserite crystals in the potassium sulfate reactor.

16. The method of claim 13 wherein the sodium chloride crystallizer produces a concentrate that includes potassium and wherein the method includes directing at least a portion of the concentrate from the sodium chloride crystallizer to the glaserite reactor and mixing the concentrate with the first brine stream.

17. The method of claim 13 wherein in the process of producing sodium chloride crystals, the sodium chloride crystallizer forms a potassium liquor and wherein the potassium liquor is directed from the sodium chloride crystallizer to the glaserite reactor.

18. A method of producing potassium sulfate from a wastewater stream containing sodium and sulfate comprising:
    directing the wastewater stream to a membrane separation unit and producing a first reject stream and a first permeate stream;
    concentrating the first reject stream to form a first brine solution or a slurry;
    mixing the first brine solution or the slurry with a potassium liquor to form a mixture;
    crystallizing the mixture in a glaserite crystallizer and producing glaserite crystals;
    separating the glaserite crystals from the potassium liquor and directing the glaserite crystals to a potassium sulfate reactor;
    mixing a potassium source with the glaserite crystals to form potassium sulfate crystals;
    separating the potassium sulfate crystals;
    wherein the potassium source mixed with the glaserite crystals in the potassium sulfate reactor forms the potassium liquor that is mixed with the first brine stream or slurry in the glaserite crystallizer;
    directing the potassium liquor from the glaserite crystallizer to a nanofiltration unit and producing a second reject stream and a second permeate stream;
    recycling the second reject stream from the nanofiltration unit to the glaserite crystallizer; and
    directing the second permeate stream from the nanofiltration unit to a sodium chloride crystallizer and producing sodium chloride crystals.

19. The method of claim 18 wherein the first permeate stream is directed to a second sodium chloride crystallizer that forms sodium chloride crystals.

20. The method of claim 19 wherein the first permeate stream is subjected to a concentration process before reaching the second sodium chloride crystallizer.

21. A method of recovering potassium sulfate from wastewater produced in a coal-to-chemical or a coal-to-liquid process, the method comprising:
    converting coal-to-chemical or coal-to-liquid and in the course of converting coal-to-chemical or liquid producing the wastewater;
    concentrating the wastewater to form a brine that includes sodium and sulfate;
    directing the brine to a mirabilite crystallizer and forming mirabilite crystals and producing a mirabilite liquor;
    separating the mirabilite crystals from the mirabilite liquor;
    directing the mirabilite crystals to a glaserite reactor or glaserite crystallizer;
    mixing a potassium liquor with the mirabilite crystals;
    producing or forming glaserite crystals from the mirabilite crystals and the potassium liquor in a glaserite reactor or a glaserite crystallizer;
    separating the glaserite crystals from the potassium liquor;
    directing the glaserite crystals to a potassium sulfate reactor;
    mixing a potassium source with the glaserite crystals in the potassium sulfate reactor to form potassium sulfate crystals;
    separating the potassium sulfate crystals; and
    wherein the potassium source mixed with the glaserite crystals in the potassium sulfate reactor forms the potassium liquor that is mixed with the glaserite crystals in the glaserite reactor.

22. The method of claim 21 including filtering the mirabilite crystallizer liquor with a nanofiltration unit to produce a permeate and directing the permeate to a sodium chloride crystallizer; and wherein the glaserite crystals are formed in the glaserite crystallizer and the method includes directing the potassium liquor from the glaserite crystallizer to a second nanofiltration unit and producing a second reject stream and a second permeate stream;
    recycling the second reject stream from the second nanofiltration unit to the glaserite crystallizer; and directing the second permeate stream from the second nanofiltration unit to the sodium chloride crystallizer.

23. The method of claim 21 wherein the glaserite crystals are produced in the glaserite reactor and wherein the potassium liquor includes sodium chloride and the method includes reducing the concentration of sodium chloride in the potassium liquor by cycling the potassium liquor back and forth between the glaserite reactor and a sodium chloride crystallizer that forms sodium chloride crystals from the potassium liquor.

24. The method of claim 21 further including directing the mirabilite liquor to a nanofiltration unit and producing a permeate and directing the permeate to the sodium chloride crystallizer that forms sodium chloride crystallizers from the mirabilite liquor.

25. The method of claim 21 wherein the glaserite crystals are formed in the glaserite crystallizer and the method includes directing the potassium liquor from the glaserite crystallizer to a nanofiltration unit and producing a reject stream and a permeate stream; recycling the reject stream from the nanofiltration unit to the glaserite crystallizer; and directing the permeate stream to a sodium chloride crystallizer and producing sodium chloride crystals.

* * * * *